United States Patent
Oh

(10) Patent No.: US 9,206,858 B2
(45) Date of Patent: Dec. 8, 2015

(54) PLUG-IN CONSTANT VELOCITY JOINT

(71) Applicant: Dana Automotive Systems Group, LLC, Maumee, OH (US)

(72) Inventor: Seung Tark Oh, Ann Arbor, MI (US)

(73) Assignee: Dana Automotives Systems Group, LLC, Maumee, OH (US)

( * ) Notice: Subject to any disclaimer, the term of this patent is extended or adjusted under 35 U.S.C. 154(b) by 0 days.

(21) Appl. No.: 14/054,886

(22) Filed: Oct. 16, 2013

(65) Prior Publication Data

US 2014/0121029 A1    May 1, 2014

Related U.S. Application Data

(60) Provisional application No. 61/718,954, filed on Oct. 26, 2012.

(51) Int. Cl.
    *F16D 3/84*    (2006.01)
(52) U.S. Cl.
    CPC .......... *F16D 3/845* (2013.01); *F16D 2003/846* (2013.01)
(58) Field of Classification Search
    CPC ..... F16C 1/04; F16D 3/845; F16D 2003/846; Y10S 464/906
    USPC ........... 464/17, 146, 173–175, 906; 277/926, 277/928
    See application file for complete search history.

(56) References Cited

U.S. PATENT DOCUMENTS

| | | | |
|---|---|---|---|
| 4,559,025 A * | 12/1985 | Dore | 464/175 |
| 6,179,717 B1 * | 1/2001 | Schwarzler | 464/175 |
| 6,264,568 B1 | 7/2001 | Frazer et al. | |
| 7,677,982 B2 * | 3/2010 | Compau et al. | 464/173 |
| 2003/0207714 A1 | 11/2003 | Ramey et al. | |

FOREIGN PATENT DOCUMENTS

| | | |
|---|---|---|
| FR | 1472517 | 3/1967 |
| GB | 2102915 A | 2/1983 |
| WO | 2011093257 A1 | 8/2011 |

* cited by examiner

*Primary Examiner* — Gregory Binda
(74) *Attorney, Agent, or Firm* — Marshall & Melhorn, LLC

(57) ABSTRACT

A plug-in constant velocity joint has an outer race and an inner race. The inner race has a plurality of splines and inner tracks. A cage is located between the outer race and the inner race. A boot sleeve is disposed against the inner race and has a first end portion, a middle portion, and a second end portion. The first end portion defines a race seat and is in contact with an end of the inner race. The second end portion defines an inner ridge, a sleeve channel and an outer ridge. A boot assembly is coupled to the outer race and comprises a boot retainer and a boot. A plug-in stub shaft is engaged with the boot sleeve and both are drivingly engaged into the inner race.

17 Claims, 3 Drawing Sheets

PLUG-IN CONSTANT VELOCITY JOINT

RELATED APPLICATIONS

This application claims the benefit of U.S. Provisional Application No. 61/718,954 filed on Oct. 26, 2012. This application is a non-provisional application filed off of U.S. patent application Ser. No. 61/718,954 filed on Oct. 26, 2012, which is incorporated by reference in its entirety herein. This non-provisional application is being filed during the pendency of U.S. patent application Ser. No. 61/718,954.

FIELD OF THE INVENTION

A plunging or fixed style constant velocity joint with a plug-in shaft.

BACKGROUND OF THE INVENTION

In the conventional plunging or fixed style constant velocity joint the propshaft is connected to an axle or transmission. Constant velocity joints allow a rotating shaft to transmit power through a variable angle, at constant rotational speed, without an appreciable increase in friction or play. There are many prior art designs for these joints, and most are complex and heavy, both of which may be costly and lower transmission efficiency. Further, it is well-known that vehicle manufacturers are striving to eliminate excessive weight where ever possible in vehicles, reduce the costs of vehicle parts, and increase performance. It would therefore be advantageous for a joint to be lightweight, which can be achieved by reducing or eliminating the hardware, such as bolts and flanges, required to connect the joint to tubes or other structures. It can be appreciated that with the reduction or elimination of connection hardware, cost savings can be achieved as well as a reducing the complexity of the joint.

SUMMARY OF THE INVENTION

A plug-in constant velocity joint comprised of an outer race and an inner race. The inner race has an inner surface with a plurality of splines and an outer surface with a plurality of inner tracks. A cage is located between the outer race and the inner race, and has a plurality of apertures for receiving torque transferring elements which are located in each of the plurality of apertures. A boot sleeve is disposed against the inner race and includes a first end portion, a middle portion, and a second end portion. The first end portion defines a race seat on an inner surface of the boot sleeve and located in contact with an end of the inner race. The second end portion is located opposite the first end portion and defines an inner ridge, a sleeve channel and an outer ridge. A boot assembly is coupled to the outer race and comprises a boot retainer and a boot. The boot has a first end portion and a second end portion. The second end portion located in contact with the second end portion of the boot sleeve, and includes an inner seal, a clamping groove and dust lip. A plug-in stub shaft is engaged with the boot sleeve and both are drivingly engaged into the inner race.

Various objects and advantages of this invention will become apparent to those skilled in the art from the following detailed description of the preferred embodiments, when read in light of the accompanying drawing.

BRIEF DESCRIPTION OF THE DRAWING

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
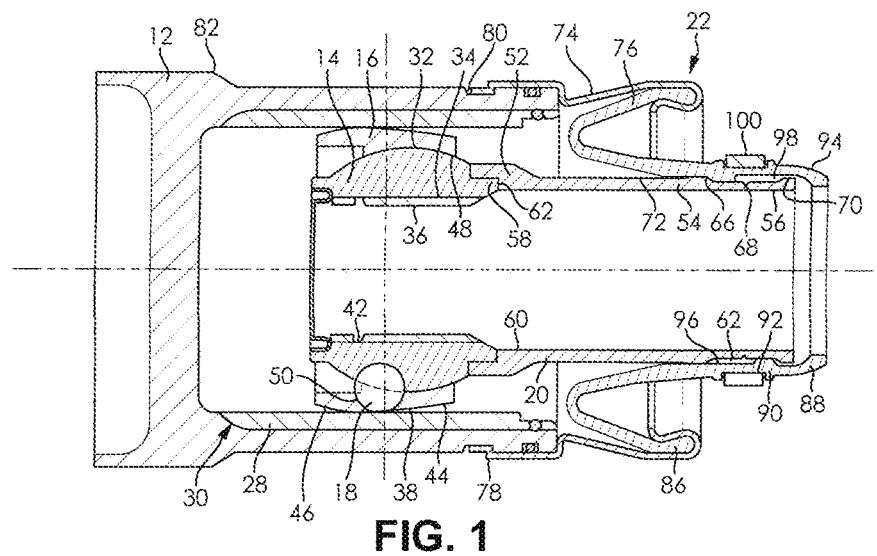
FIG. 1 is a cross-sectional side view of the races, the boot sleeve and the boot assembly.
Figure 2:
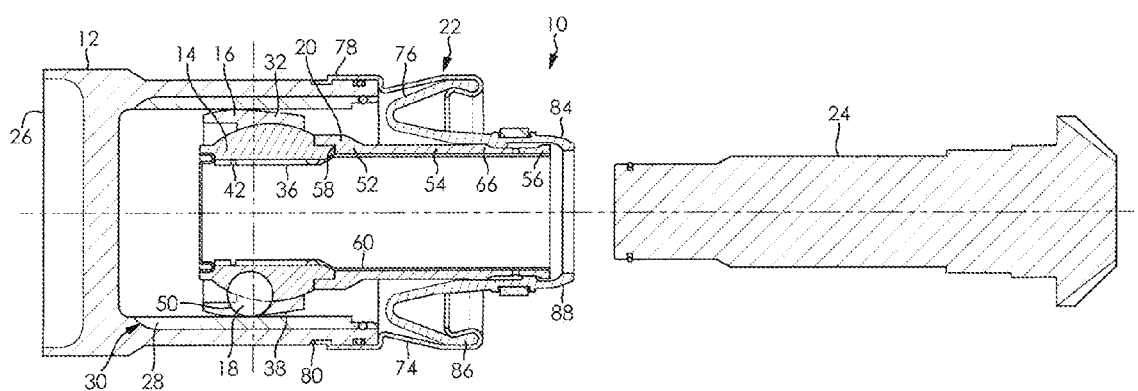
FIG. 2 is a cross-sectional side view of the present invention unassembled.
Figure 3:
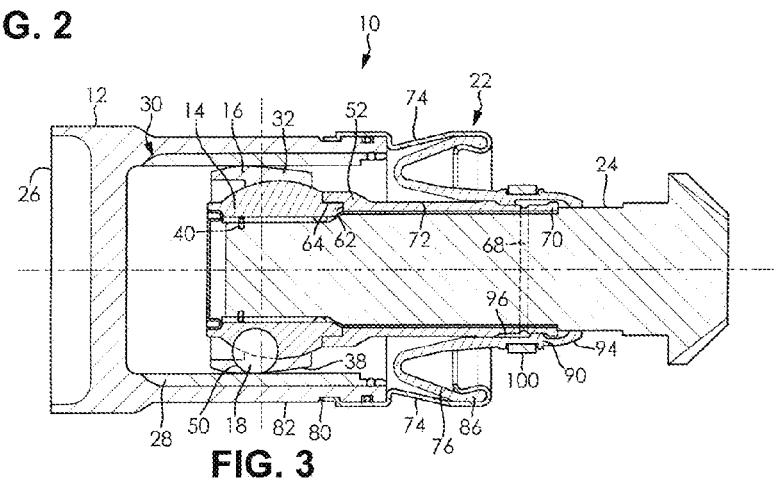
FIG. 3 is a is a cross-sectional assembled view of the present invention.

FIG. 1 illustrates a plug-in constant velocity joint 10 according to an embodiment of the invention. The plug-in constant velocity joint 10 includes an outer race 12, an inner race 14, a cage 16, a plurality of torque transferring elements 18, a boot sleeve 20, and a boot assembly 22. A plug-in stub shaft 24, shown in FIGS. 2 and 3 is drivingly engaged with the inner race 14. The plug-in constant velocity joint 10 is a double offset constant velocity joint; however, it is understood that the plug-in constant velocity joint 10 may be any other type of constant velocity joint.

The outer race 12, as shown in FIGS. 1-3 is a hollow cylindrical body formed from a rigid material such as steel. The outer race 12 is typically forged and then machined in a secondary operation. However, it is understood the outer race 12 may be formed using any other process from any other material. An attachment end 26 is formed on the outer race 12, and is drivingly engaged with an input shaft or an output shaft (not shown).

A plurality of outer tracks 28 are formed in an inner surface 30 of the outer race 12. Each of the outer tracks 28 has an arcuate profile having a diameter and a centerline parallel to an axis of the outer race 12. Alternately, the outer race 12 may include the plurality of outer tracks 28 having alternating depths. The outer race 12 includes six outer tracks 28 formed therein. However, it is understood that each of the outer tracks 28 may have a non-arcuate profile and any number of the outer tracks 28 may be formed in the outer race 12. The plurality of outer tracks 28 is equally spaced about the axis of the outer race 12.

The inner race 14 is a hollow member formed from a rigid material such as steel. It is understood that the inner race 14 may be formed in any conventional manner and may be formed from any other material. When the plug-in stub shaft 24 is drivingly engaged with the inner race 14, the inner race 14 is typically spliningly disposed on an end portion of the plug-in stub shaft 24.

The inner race 14 includes an outer surface 32 and an inner surface 34. The outer surface 32 is a spherical surface of the inner race 14 having a center point different than the joint pivot point. The inner surface 34 defines a cylindrical bore through the inner race 14. A plurality of splines 36 are formed on the inner surface 34 for drivingly engaging the inner race 14 with the plug-in stub shaft 24.

A plurality of inner tracks 38 are formed on the outer surface 32 of the inner race 14. Each of the inner tracks 38 has an arcuate profile having a diameter and a centerline parallel to an axis of the inner race 14. Alternately, the inner race 14 may include the plurality of inner tracks 38 having alternating depths. The diameter of the arcuate profile of each of the inner tracks 38 is complementary to the diameter of the arcuate profile of each of the outer tracks 28 corresponding thereto. As shown in FIGS. 1-3, a depth of each of the inner tracks 38 varies depending on a distance the outer surface 32 of the inner race 14 is from the axis of the inner race 14. The inner race 14 includes six inner tracks 38 formed therein. However, it is understood that each of the inner tracks 38 may have a non-arcuate profile and any number of the inner tracks 38 may be formed in the inner race 14. The plurality of inner tracks 38 is equally spaced about the axis of the inner race 14.

The inner race 14 is secured to the plug-in stub shaft 24 using a snap ring 40 disposed in a groove 42 formed on an outer surface of the plug-in stub shaft 24, as shown in FIGS. 2 and 3. Alternately, any other type of fastener may be used to secure the inner race 14 to the plug-in stub shaft 24.

The cage 16, as shown in FIGS. 1-3 is disposed between the outer race 12 and the inner race 14. The cage 16 is a hollow body machined from a rigid material such as steel. However, it is understood the cage 16 may be formed using any other process from any other material. The cage 16 includes a conical outer surface 44, a spherical outer surface 46, and a spherical inner surface 48. A plurality of apertures 50 are formed through the cage 16.

The conical outer surface 44 is a tapered portion of the cage 16. A portion of the conical outer surface 44 defines a portion of each of the apertures 50.

The spherical outer surface 46 has a center point different from the outer surface 32 on the inner race 14. A portion of the spherical outer surface 46 defines a portion of each of the apertures 50. The spherical outer surface 46 is disposed against and slidingly engages the inner surface 30 of the outer race 12. A diameter of the spherical outer surface 46 is complementary to the inner surface 30 of the outer race 12. The spherical outer surface 46 and the spherical inner surface 48 are precision machined for use as mating surfaces of a constant velocity joint as is known in the art.

The spherical inner surface 48 has a center point common with the outer surface 32 of the inner race 14. A portion of the spherical inner surface 48 defines a portion of each of the apertures 50. The spherical inner surface 48 is disposed against and slidingly engages the outer surface 32 of the inner race 14. A radius of the spherical inner surface 48 is complementary to a radius of the outer surface 32 of the inner race 14. The spherical inner surface 48 and the outer surface 32 of the inner race 14 are precision machined for use as mating surfaces of a constant velocity joint as is known in the art.

As shown in FIGS. 1-3, the plurality of torque transferring elements 18 comprises steel spheres disposed in each of the apertures 50, the outer tracks 28, and the inner tracks 38. Each of the torque transferring elements 18 is a ball bearing as is known in the art. However, it is understood that the plurality of torque transferring elements 18 may be any other shape and formed from any other rigid material. A diameter of each of the torque transferring elements 18 is complementary to the diameter of the arcuate profiles of each of the outer tracks 28 and the inner tracks 38. The torque transferring elements 18, the outer tracks 28, and the inner tracks 38 are precision machined for use as mating surfaces of a constant velocity joint as is known in the art. One torque transferring element 18 is disposed and in sliding engagement with each of the outer tracks 28 and each of the inner tracks 38.

The boot sleeve 20, as shown FIGS. 1-3, is a hollow member formed from a rigid material such as steel. It is understood that the boot sleeve 20 may be formed in any conventional manner and may be formed from any other rigid material. The boot sleeve 20 is disposed against and is in driving engagement with the inner race 14. The boot sleeve 20 comprises a first end portion 52, a middle portion 54, and a second end portion 56. When the plug-in stub shaft 24 is drivingly engaged with the inner race 14 the plug-in stub shaft 24 passes through the boot sleeve 20.

The first end portion 52 is a hollow portion of the boot sleeve 20 drivingly engaged with the inner race 14 using a press fit, a threading engagement, or another type of fastener. Alternately, it is understood that the boot sleeve 20 may be unitarily formed with the inner race 14. The first end portion 52 defines a race seat 58 in an inner surface 60 of the boot sleeve 20. When the first end portion 52 is drivingly engaged with the inner race 14, a portion of the inner race 14 is disposed against the race seat 58. The race seat 58 has a first inner surface 62 and a second inner surface 64 in which the first inner surface 62 is perpendicular to the inner surface 60 of the boot sleeve 20. The second inner surface 64 of the race seat 58 is parallel to and has a larger diameter than the inner surface 60 of the boot sleeve 20. As shown in FIGS. 1-3, an end of the inner race 14 is complementary in shape to the race seat 58 so as to provide a secure fit when the boot sleeve 20 is engaged with and into the inner race 14.

The middle portion 54 is a hollow cylindrical portion of the boot sleeve 20 formed between the first end portion 52 and the second end portion 56 and has a substantially constant outer diameter. Alternatively, the middle portion 54 may be any other shape.

The second end portion 56 is a hollow portion of the boot sleeve 20 formed opposite the first end portion 52. The second end portion 56 defines an inner ridge 66, a sleeve channel 68, and an outer ridge 70. The second end portion 56 is sealingly engaged with a portion of the boot assembly 22.

The inner ridge 66 is an annular protuberance forming a portion of the second end portion 56. The inner ridge 66 is an integrally formed portion of the boot sleeve 20 which extends radially outwardly from an outer surface 72 of the boot sleeve 20 and is sealingly engaged with a portion of the boot assembly 22.

The sleeve channel 68 is an annular recess defined by the second end portion 56 of the boot sleeve 20, between the inner ridge 66 and the outer ridge 70. The sleeve channel 68 extends radially inwardly from the outer surface 72 of the boot sleeve 20. The sleeve channel 68 has a substantially V-shaped cross section; however, it is understood that the sleeve channel 68 may be any other shape.

The outer ridge 70 is an annular protuberance forming a portion of the second end portion 56. The outer ridge 70 is an integrally formed portion of the boot sleeve 20 which extends radially outwardly from the outer surface 72 of the boot sleeve 20 and is sealingly engaged with a portion of the boot assembly 22.

As seen in FIGS. 1-3, the boot assembly 22 comprises a boot retainer 74 and a boot 76. The boot assembly 22 is disposed on the outer race 12 and is in sealing engagement with the boot sleeve 20. The boot 76 is coupled to the boot retainer 74.

Figure 5:
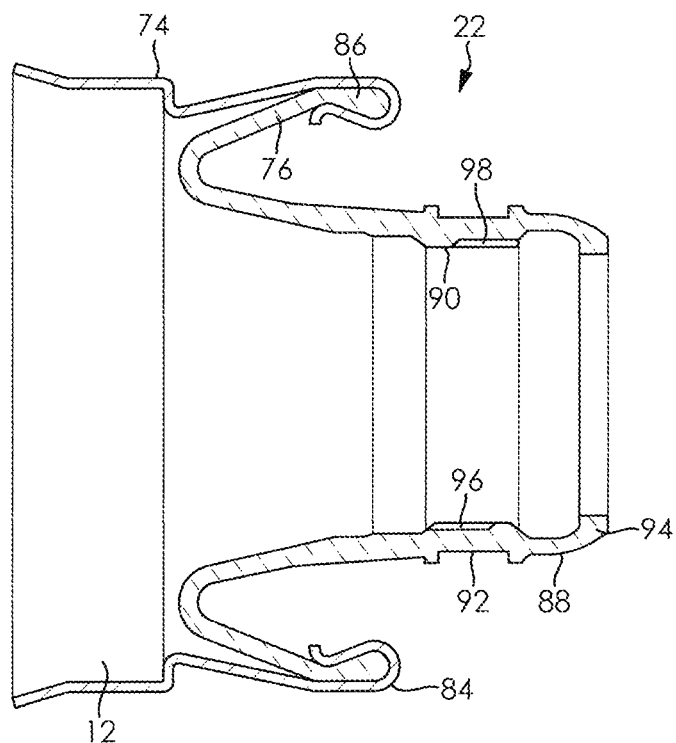
FIG. 5 is a cross-sectional side view of FIG. 5.

The boot retainer 74 is an annular member formed from a rigid material, such as a metal or a plastic. The boot retainer 74 is coupled to and is sealingly engaged with the outer race 12. A first end portion 78 of the boot retainer 74 engages a groove 80 formed on an outer surface 82 of the outer race 12; however, it is understood that the boot retainer 74 may be coupled to the outer race 12 in any manner. A second end portion 84 has a U-shaped cross-section and partially encloses a portion of the boot 76 to couple the boot 76 to the boot retainer 74, as seen in FIG. 5. Alternately, the second end portion 84 may be other shapes that facilitate coupling the boot 76 to the boot retainer 74.

Also as clearly shown in FIG. 5, the boot 76 is an annular member having a J-shaped cross-section formed from a resilient material, such as an elastomer. The boot 76 facilitates movement between the outer race 12 and the boot sleeve 20 while sealing engagement is maintained therebetween. A first end portion 86 of the boot 76 is coupled to the boot retainer 74 as described hereinabove. A second end portion 88 of the boot 76 is sealingly engaged with the second end portion 56 of the boot sleeve 20, as shown in FIGS. 1-3. The second end portion 88 comprises an inner seal 90, a clamping groove 92, and a dust lip 94.

Figure 4:
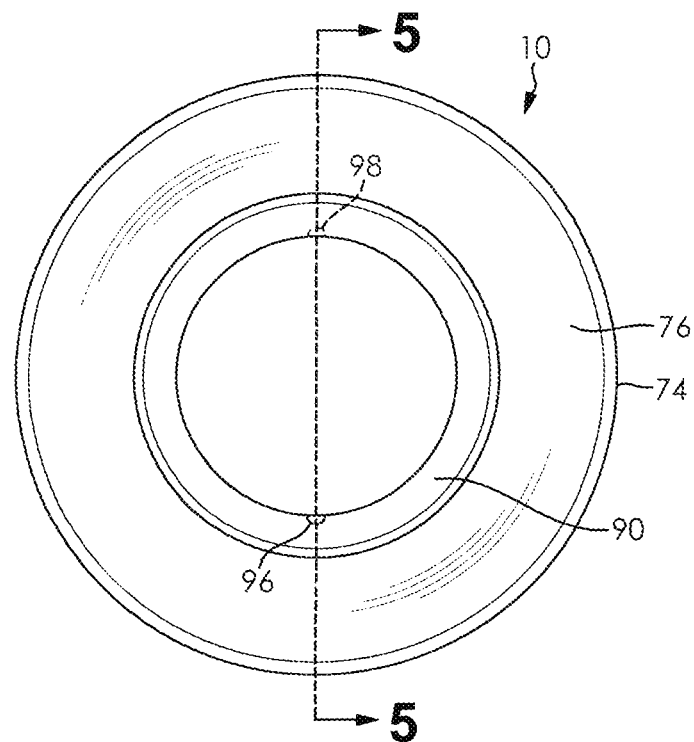
FIG. 4 is an end view of the boot assembly.

The inner seal 90 is an annular protuberance forming a portion of the second end portion 88 of the boot 76. The inner seal 90 is an integrally formed portion of the boot 76 and extends radially inwardly from the second end portion 88 and is sealingly engaged with portions of the boot sleeve 20 on each side of the sleeve channel 68, between the inner ridge 66 and the outer ridge 70. The inner seal 90 defines at least one inner axial groove 96 and at least one outer axial groove 98, as shown in FIGS. 4 and 5. The boot 76 shown in FIGS. 1-4 includes two inner axial grooves 96 and two outer axial grooves 98 alternately and equidistantly spaced about the inner seal 90.

Each of the inner axial grooves 96 is a recess defined by a portion of the inner seal 90. Each of the inner axial grooves 96 extend from an innermost edge of the inner seal 90 towards an outermost edge of the inner seal 90, but not through the inner seal 90. Each of the inner axial grooves 96 is substantially parallel to an axis of the boot sleeve 20 and extends past the sleeve channel 68 from the innermost edge when the boot 76 is disposed over the boot sleeve 20.

Each of the outer axial grooves 98 is a recess defined by a portion of the inner seal 90. Each of the outer axial grooves 98 extend from the outermost edge of the inner seal 90 towards the innermost edge of the inner seal 90, but not through the inner seal 90. Each of the outer axial grooves 98 is substantially parallel to an axis of the boot sleeve 20 and extends past the sleeve channel 68 from the outermost edge when the boot 76 is disposed over the boot sleeve 20.

The clamping groove 92 as shown in FIG. 5, is an annular recess defined by the second end portion 88 of the boot 76, on an outer surface thereof. The clamping groove 92 extends radially inwardly from an outer surface of the boot 76. The clamping groove 92 is substantially aligned with a portion of the boot sleeve 20 between the inner ridge 66 and the outer ridge 74 and the sleeve channel 68. As seen in FIGS. 1-3, a clamp 100 disposed about the boot 76 in the clamping groove 92 applies a force to the inner seal 90, causing the inner seal 90 to sealingly engage the portions of the boot sleeve 20 on each side of the sleeve channel 68.

The dust lip 94 is a portion of the second end portion 88 of the boot 76. The dust lip 94 is an annular, inwardly extending member. A portion of the dust lip 94 is disposed adjacent the plug-in stub shaft 24 when the plug-in stub shaft 24 is disposed in the boot sleeve 20, as shown in FIG. 3. The dust lip 94 is unitarily formed with the boot 76; however, it is understood that the dust lip 94 may be formed separate from the boot 76 and coupled thereto using any conventional fastener. The dust lip 94 militates against entry by foreign debris into an area enclosed by the outer race 12 and the boot assembly 22. The dust lip 94 extends radially beyond the second end portion 56 of the boot sleeve 20, as shown in FIG. 1.

In use, the plug-in constant velocity joint 10 facilitates fluid communication between the area enclosed by the outer race 12 and the boot assembly 22 and an ambient environment the plug-in constant velocity joint 10 is in. Fluid communication between the area enclosed by the outer race 12 and the boot assembly 22 and an ambient environment the plug-in constant velocity joint 10 is in facilitates disposal of the plug-in stub shaft 24 within the plug-in constant velocity joint 10, militates against pressurization of the plug-in constant velocity joint 10, and militates against a vacuum being drawn on the area enclosed by the outer race 12 and the boot assembly 22.

The plug-in constant velocity joint 10 facilitates disposal of the plug-in stub shaft 24 within the plug-in constant velocity joint 10. When the plug-in stub shaft 24 is disposed within the boot sleeve 20 and the inner race 14, the plug-in stub shaft 24 disposes air present in the boot sleeve 20 and the inner race 14. Due to the plug-in stub shaft 24 being precisely formed to correspond to the boot sleeve 20 and the inner race 14, the air present in the area enclosed by the outer race 12 and the boot assembly 22 may become pressurized. Upon pressurization, the air equalizes with the ambient environment by exiting the area enclosed by the outer race 12 and the boot assembly 22 by passing between the boot 76 and the boot sleeve 20. Air passes between the boot 76 and the boot sleeve 20 to equalize with the ambient environment by passing over the inner ridge 66, through the inner axial groove 96, the sleeve channel 68, and the outer axial groove 98, and lastly passing over the outer ridge 70. Such a path militates against the air from dislodging a portion of the boot assembly 22 or disposing a lubricant from within the area enclosed by the outer race 12 and the boot assembly 22.

The plug-in constant velocity joint 10 militates against pressurization of the plug-in constant velocity joint 10. During a period of operation of the plug-in constant velocity joint 10 or when the ambient environment of the plug-in constant velocity joint 10 increases in temperature, the air present in the area enclosed by the outer race 12 and the boot assembly 22 may increase in temperature and become pressurized. Upon pressurization, the air equalizes with the ambient environment by exiting the area enclosed by the outer race 12 and the boot assembly 22 by passing between the boot 76 and the boot sleeve 20. Air passes between the boot 76 and the boot sleeve 20 to equalize with the ambient environment by passing over the inner ridge 66, through the inner axial groove 96, the sleeve channel 68, and the outer axial groove 98, and lastly passing over the outer ridge 70. Such a path militates against the air from dislodging a portion of the boot assembly 22 or disposing a lubricant from within the area enclosed by the outer race 12 and the boot assembly 22.

The plug-in constant velocity joint 10 militates against a vacuum being drawn on the area enclosed by the outer race 12 and the boot assembly 22. After a period of operation of the plug-in constant velocity joint 10 or when the ambient environment of the plug-in constant velocity joint 10 decreases in temperature, the air present in the area enclosed by the outer race 12 and the boot assembly 22 may decrease in temperature and a vacuum may be drawn on the area enclosed by the outer race 12 and the boot assembly 22. When a vacuum is drawn, the ambient environment equalizes with the area enclosed by the outer race 12 and the boot assembly 22 by air passing between the boot 76 and the boot sleeve 20. Air passes between the boot 76 and the boot sleeve 20 to equalize with the area enclosed by the outer race 12 and the boot assembly 22 by passing over the outer ridge 70, through the outer axial groove 98, the sleeve channel 68, the inner axial groove 96, and lastly the inner ridge 66. Such a path militates against the air from dislodging a portion of the boot assembly 22 or militates against entry by foreign debris into the area enclosed by the outer race 12 and the boot assembly 22.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A plug-in constant velocity joint, comprising:
   an outer race having an inner surface, an outer surface and an attachment end;
   an inner race having an inner surface comprising a plurality of splines and an outer surface comprising a plurality of inner tracks ;
   a cage located between said outer race and said inner race and comprising a plurality of apertures;
   a plurality of torque transferring elements located in each of said plurality of apertures of said cage;
   a boot sleeve having a first end portion, a middle portion, and a second end portion, said first end portion defines a race seat on an inner surface of said boot sleeve and is located in contact with an end of said inner race, said second end portion is located opposite said first end portion and defines an inner ridge, a sleeve channel and an outer ridge, said inner ridge extends radially outwardly from an outer surface of said boot sleeve, said sleeve channel is an annular recess which extends radially inwardly from said outer surface of said boot sleeve and is located between said inner ridge and said outer ridge, said outer ridge extends radially outwardly from said outer surface of said boot sleeve;
   a boot assembly comprising a boot retainer and a boot, said boot comprises a first end portion and a second end portion wherein said second end portion is located in contact with said second end portion of said boot sleeve, said second end portion of said boot comprising an inner seal, a clamping groove and dust lip, said inner seal extends radially inwardly from said second end portion of said boot and defines at least one inner axial groove and at least one outer axial groove; and
   a plug-in stub shaft.

2. A plug-in constant velocity joint according to claim 1, wherein said inner surface of said outer race comprises a plurality of outer tracks with an non-arcuate profile.

3. A plug-in constant velocity joint according to claim 1, wherein said inner tracks on said outer surface of said inner race have an arcuate profile including a diameter and a center line parallel to an axis of said inner race.

4. A plug-in constant velocity joint according to claim 1, wherein said cage comprises a conical outer surface, a spherical outer surface and a spherical inner surface.

5. A plug-in constant velocity joint according to claim 1, wherein said race seat has a first inner surface and a second inner surface, said first inner surface of said race seat is perpendicular to said inner surface of said boot sleeve and said second inner surface of said race seat is parallel to and has a larger diameter than said inner surface of said boot sleeve.

6. A plug-in constant velocity joint according to claim 1, wherein an end of said inner race is adjacent to and complementary in shape to said race seat.

7. A plug-in constant velocity joint according to claim 1, wherein said middle portion of said boot sleeve has a substantially constant outer diameter.

8. A plug-in constant velocity joint according to claim 1, wherein said sleeve channel of said boot sleeve has a substantially v-shaped cross section.

9. A plug-in constant velocity joint according to claim 1, wherein a first end portion of said boot retainer is located on said outer race and a second end portion of said boot retainer is in contact with said first end portion of said boot.

10. A plug-in constant velocity joint according to claim 1, wherein a first end portion of said boot retainer comprises a hooked end which may be substantially aligned with a groove formed in said outer surface of said outer race.

11. A plug-in constant velocity joint according to claim 1, wherein said boot has a J-shaped cross-section.

12. A plug-in constant velocity joint according to claim 1, wherein said inner axial groove of said boot is a recess defined by a portion of said inner seal and extends from an innermost edge of said inner seal towards an outermost edge of said inner seal.

13. A plug-in constant velocity joint according to claim 1, wherein said inner axial groove of said boot is substantially parallel to an axis of said boot sleeve.

14. A plug-in constant velocity joint according to claim 1, wherein said outer axial groove of said boot is a recess defined by a portion of said inner seal and extends from an outermost edge of said inner seal towards an innermost edge of said inner seal.

15. A plug-in constant velocity joint according to claim 1, wherein said outer axial groove of said boot is substantially parallel to an axis of said boot sleeve.

16. A plug-in constant velocity joint according to claim 1, wherein said clamping groove is substantially aligned with a portion of said boot sleeve located between said inner ridge and said outer ridge of said second end portion of said boot sleeve.

17. A plug-in constant velocity joint according to claim 1, wherein said second end portion of said boot terminates with said dust lip, said dust lip extends axially beyond said second end portion of said boot sleeve.

* * * * *